Sept. 23, 1969     H. G. ROGERS     3,468,228

COLOR COMPENSATED SHUTTER

Filed Sept. 2, 1966     3 Sheets-Sheet 1

INVENTOR.
Howard G. Rogers

BY
Brown and Mikulka
and
John H. Coult
ATTORNEYS

Sept. 23, 1969

H. G. ROGERS 3,468,228

COLOR COMPENSATED SHUTTER

Filed Sept. 2, 1966

INVENTOR.
Howard G. Rogers
BY
Brown and Mikulka
and
John H. Coult
ATTORNEYS

United States Patent Office 3,468,228
Patented Sept. 23, 1969

1

3,468,228
COLOR COMPENSATED SHUTTER
Howard G. Rogers, Weston, Mass., assignor to Polaroid Corporation, Cambridge, Mass., a corporation of Delaware
Filed Sept. 2, 1966, Ser. No. 576,886
Int. Cl. G03b 33/00, 27/02, 27/78
U.S. Cl. 95—12.20                         7 Claims

ABSTRACT OF THE DISCLOSURE

An automatic shutter mechanism which incorporates a selection of color compensating filters. The filters are selected for transmitting light in a broad band of frequencies in different portions of the visible spectrum. During an exposure, each filter is positioned simultaneously over both the photosensor of an exposure timing system and the taking aperture of the shutter for an interval inversely related to the intensity of light transmitted by that filter. With the arrangement, a balanced spectral distribution of light admitted through the exposure aperture to a photosensitive material behind the aperture is produced.

---

Figure 1:
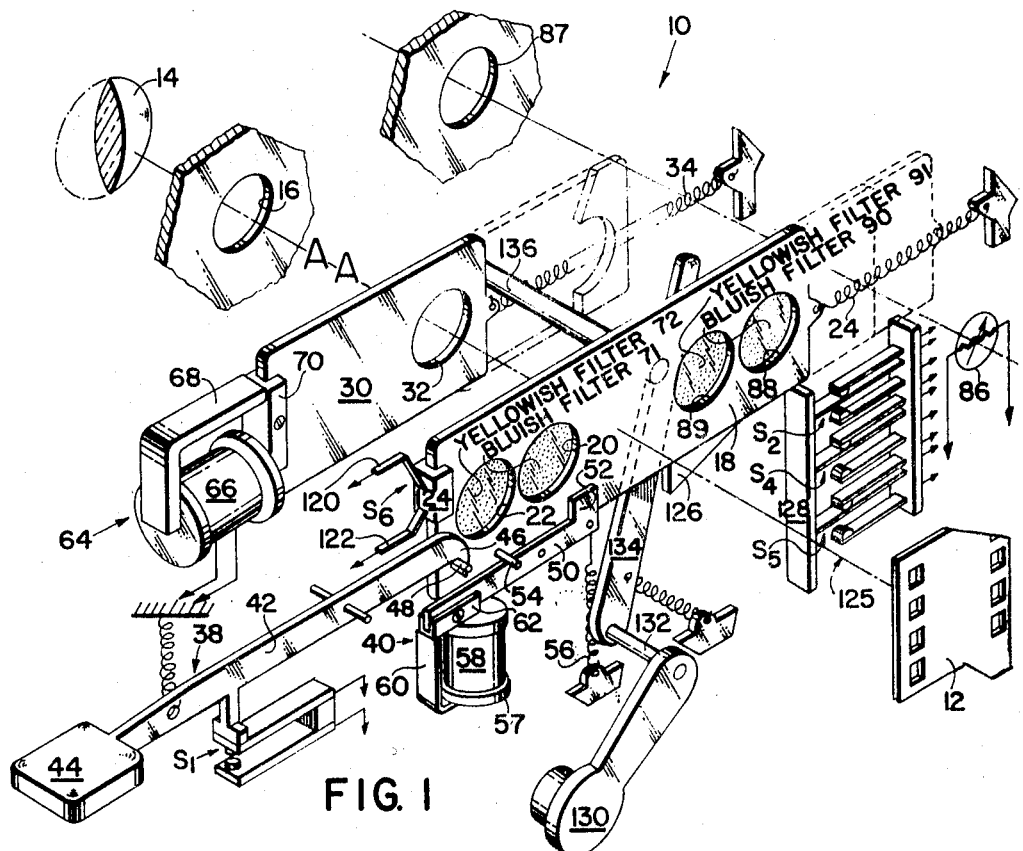

This invention relates to a shutter mechanism for a photographic camera, and more particularly to a shutter mechanism for automatically effecting a color balanced exposure of photosensitive material within the camera.

In certain common photographic conditions, the spectral distribution of the light emanating from the scene is not balanced across the visible spectrum. Rather, there may be a concentration of light of frequencies at the higher or lower energy portions of the spectrum. For example, an outdoor exposure of a scene including a substantial area of blue sky may have a relatively high color temperature, the light being composed predominately of relatively high frequency radiation in the tonally "cooler" portion of the spectrum.

Often in such spectrally imbalanced lighting conditions, with photosensitive material which is not color compensated for such conditions, a color compensating filter is used to adjust the color temperature of the radiation reaching the photosensitive material.

The precision and accuracy of the color compensation capable of being achieved with a constant shutter speed by the manual selection and employment of color compensating filters is restricted by the number and range of available filters and the precision of the means used for ascertaining the color temperature of the scene light.

This invention contemplates the provision of an automatic shutter mechanism including means for automatically, quickly, and accurately effecting color compensation of the exposure light without the need for a separate device for ascertaining color temperature and a selection of color compensating filters.

Accordingly, it is an object of this invention to provide a shutter mechanism for photographic apparatus for automatically effecting a color balanced exposure of photosensitive material within the apparatus.

It is another object of this invention to provide an automatically actuated shutter mechanism including a plurality of color compensating filters, each filter transmitting light in a broad band of frequencies in a different portion of the visible spectrum, and including means for effecting a sequential positioning of each of said filters individually over an exposure aperture on the optical axis of the optical system for the camera for an exposure interval inversely related to the intensity of light transmitted by that filter, whereby a balanced spectral distribution of light admitted through the exposure aperture to the photosensitive material is produced.

2

It is a further object of this invention to provide means in an automatically actuated photographic shutter mechanism for automatically effecting a highly accurate color compensation of the light which is admitted to expose photosensitive material, which means is relatively inexpensive, simple, and readily adapted for use with presently existing automatic shutter mechanisms.

Briefly, a shutter mechanism implementing the inventive concept may include first shutter means for unblocking an exposure aperture to initiate exposure and second shutter means for blocking the exposure aperture to terminate exposure. Filter mounting means, which may be a part of the first shutter means for unblocking the exposure aperture or a separate member, may carry a plurality of filter means, each of the filter means transmitting light in a broad band of frequencies, the bands being uniformly distributed across the visible spectrum. For example, a two filter system may employ a bluish filter for transmitting light in a broad band of frequencies in the higher energy portion of the spectrum and a yellowish filter transmitting light in a broad band of frequencies in the lower energy portion of the spectrum. Filters would be selected having spectral transmission curves overlapping in the green region of the visible spectrum in order that the light reaching the photosensitive material is balanced throughout the middle wavelength, as well as the long and short wavelength regions of the spectrum.

Each filter means may comprise a first area positionable on the optical axis over the exposure aperture and a second area simultaneously positionable over a photoresponsive means exposed to the scene, whereby the photosensitive material on the optical axis and the photoresponsive means are exposed to light of the same spectral content. Control means may be provided for effecting a sequential positioning of each of said filter means over the exposure aperture for an interval inversely related to the intensity of light transmitted by that filter means, whereby a balanced spectral distribution of light admitted through the filter means to the photosensitive material is produced, the control means actuating the second shutter means to terminate exposure after a total exposure interval representing the sum of said intervals.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

Figure 3:
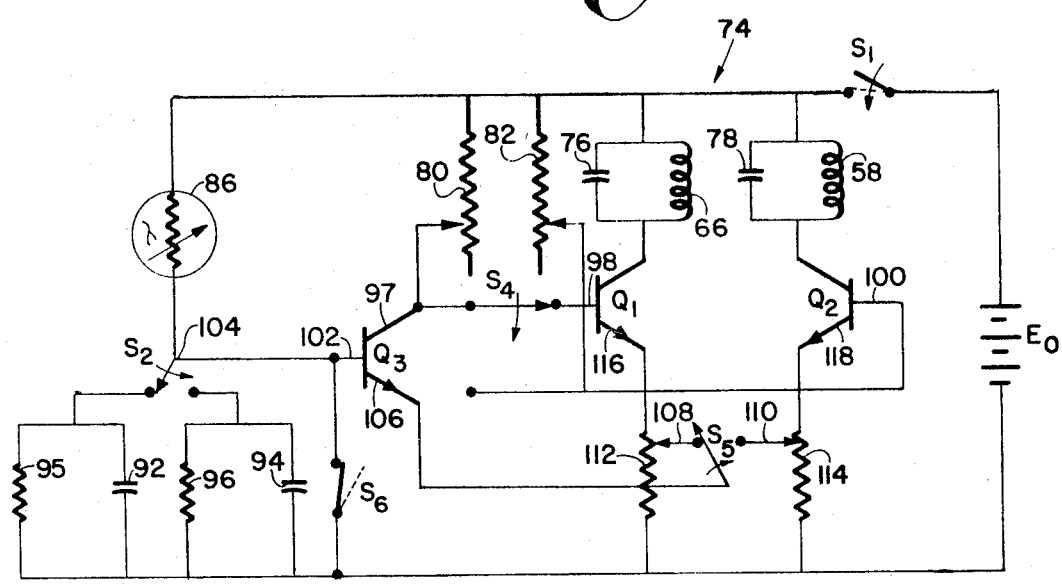
Figure 4:
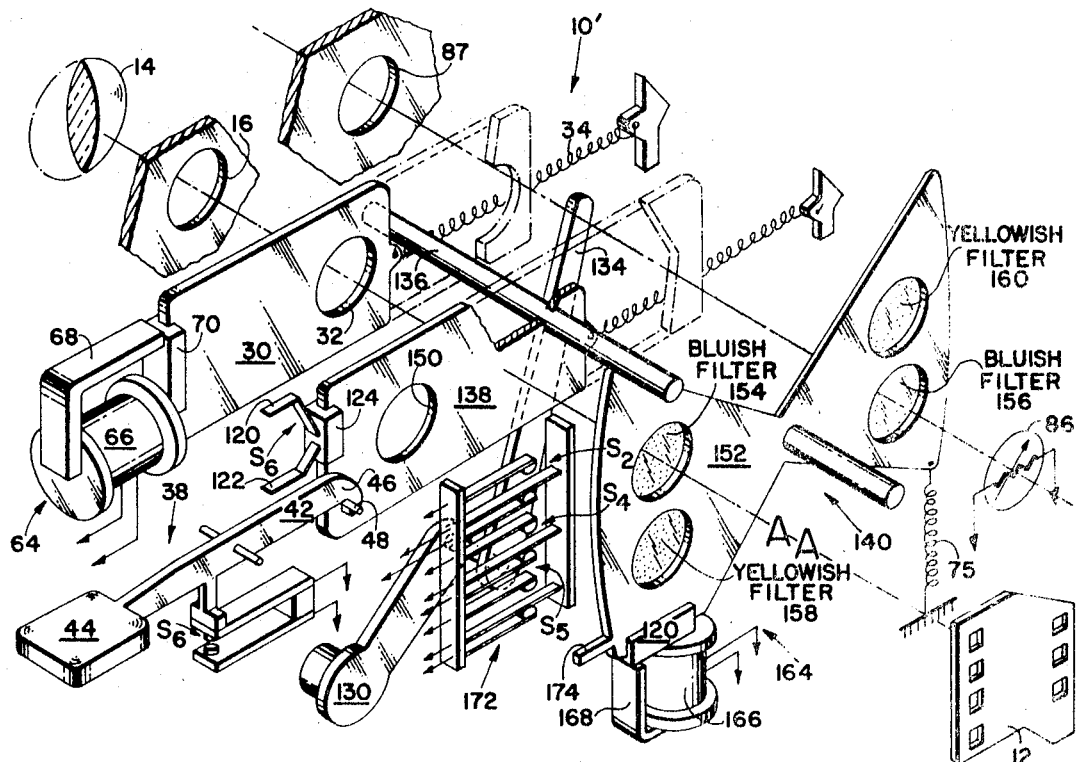
Figure 2:
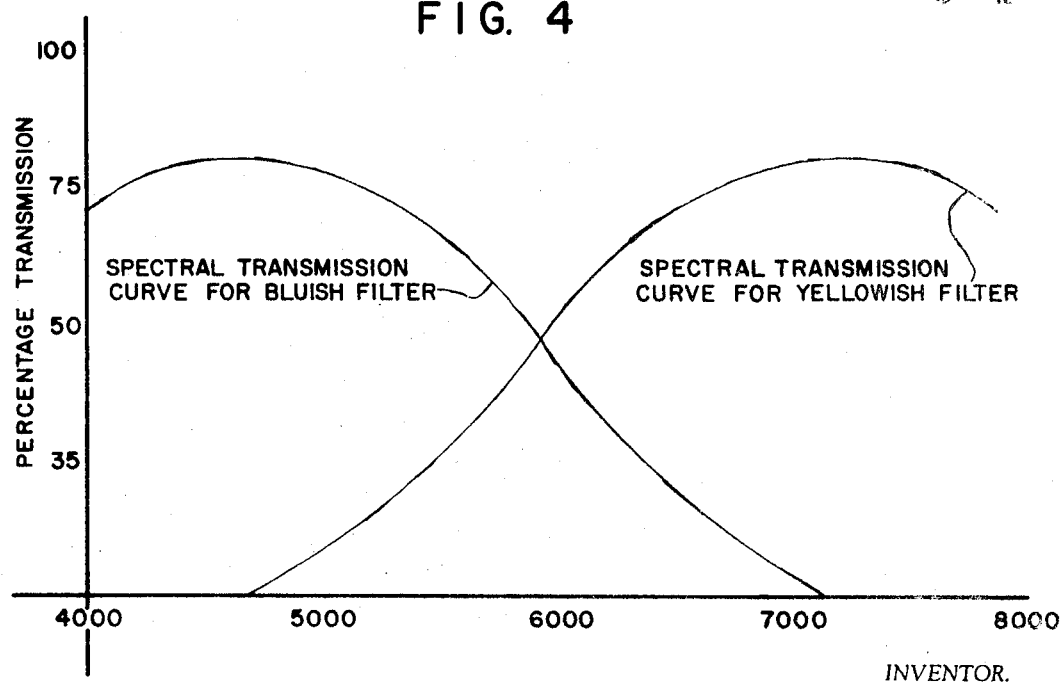
Figure 5:
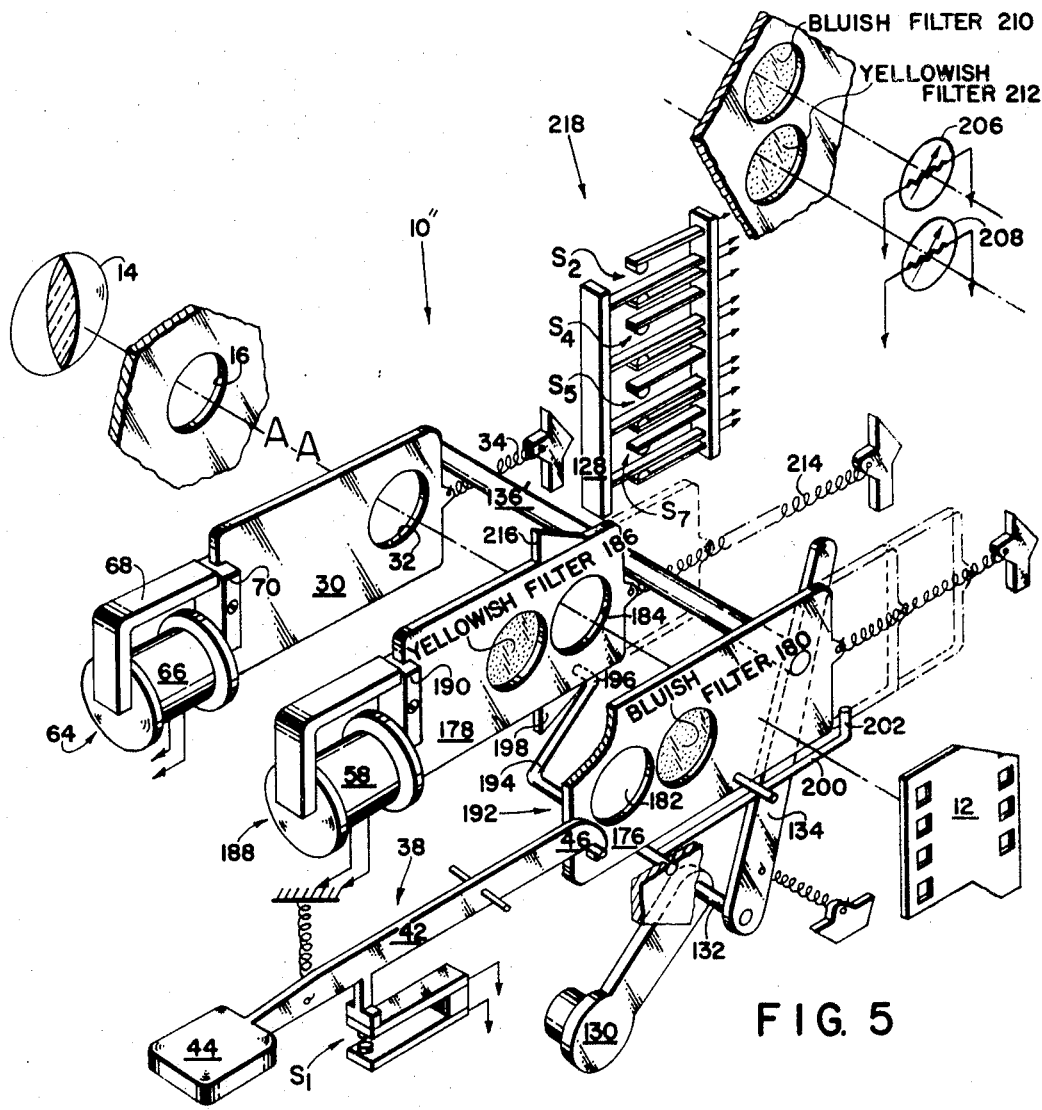
Figure 6:
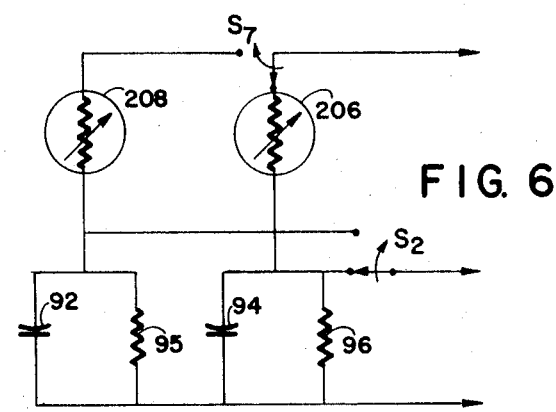

For a fuller understanding of the nature and objects of the invention, reference should be had to the following detailed description taken in connection with the accompanying drawings wherein:

FIGURE 1 schematically illustrates an automatically actuated shutter mechanism incorporating means for effecting a color balanced exposure of photosensitive materials in accordance with the invention;

FIG. 2 is a diagram illustrating spectral transmission curves for two filters which may be used in the practice of the invention;

FIG. 3 diagrammatically depicts a trigger circuit for controlling the actuation of the shutter mechanism illustrated in FIGURE 1;

FIG. 4 schematically portrays another automatically actuated shutter mechanism including alternate means for effecting a color balanced exposure of photosensitive materials in accordance with the invention;

shutter mechanism including alternate means for effecting a color balanced exposure of photosensitive materials in accordance with the invention;

FIG. 5 schematically shows yet another automatically actuated shutter mechanism including an additional form of means for effecting a color balanced exposure of photosensitive materials in accordance with the invention; and FIG. 6 is a schematic representation of a timing network which constitutes an alternate form of a part of the trigger circuit shown in FIG. 2 and which is useful in the practice of the invention with the shutter mechanism shown in FIG. 5.

Multiple and diverse structures and applications are contemplated for carrying out the principles of the invention. FIGURE 1 illustrates one translation of the invention into structure. FIGURE 1 shows a shutter mechanism 10 operating to control the exposure of a photosensitive material 12 to scene light through an objective lens 14 and an exposure aperture 16 on an optical axis A—A.

The shutter mechanism 10 includes an opening shutter blade 18 movable across the optical axis A—A from a light blocking position (shown in solid lines in FIGURE 1). To first and second light unblocking positions (shown in broken lines in FIGURE 1). When the opening blade is disposed in its first light unblocking position, an exposure orifice 20 is located on the optical axis A—A in registration with the exposure aperture 16. When the opening blade 18 is disposed in its second light unblocking position exposure of the photosensitive material 12 may be achieved through a second exposure orifice 22. A spring 24 urges the opening blade 18 toward its light unblocking positions.

The shutter mechanism 10 may include a closing shutter blade 30 movable from a light unblocking position (shown in solid lines in FIGURE 1) wherein an exposure orifice 32 is disposed upon the optical axis A—A to a light blocking position (shown in broken lines in FIGURE 1). A spring 34 urges the closing blade 30 towards its light blocking position.

In order to control the movement of the opening blade 18 across the optical axis A—A from its light blocking position to its first and second light unblocking positions, there may be provided a manually operable actuator 38 and an electromagnetically actuated latch means 40. The actuator 38 may comprise a centrally pivoted lever 42 having a manually depressible end 44 and a hooked working end 46 engageable with a pin 48 extending transversely from the opening blade 18.

Latch means 40 includes a centrally-pivoted latch member 50 having a transversely extending end portion 52 effective when the latch member 50 is in its operative position to retentively engage a pin 54 extending transversely from the opening blade 18. The latch member 50 is urged in a clockwise direction toward an inoperative position by a spring 56.

Latch means 40 further includes an electromagnet 57 for providing electrical control of the latch member 50. The electromagnet 57 comprises a coil 58 which magnetizes a pole piece 60, when energized, to effect a magnetic attraction of a ferromagnetic keeper 62 on latch member 50. Deenergization of the coil 58 when the opening blade 18 is in its first light unblocking position and the latch member 50 is in retentive engagement with pin 54 effects a disengagement of the latch member 50 from the pin 54 to release the opening blade 18 for movement under the influence of spring 24 to its second light unblocking position.

In order to provide electrical control of the release of the closing blade 30 to terminate exposure, an electromagnet 64 may be provided. The electromagnet 64 comprises a coil 66 which magnetizes a pole piece 68, when energized, to effect a magnetic attraction of a ferromagnetic keeper 70 on closing blade 30.

Thus, by means of the electromagnetically actuated latch means 40 and the electromagnet 64, a successive exposure of the photosensitive material 12 through the exposure orifices 20, 22 can be effected electrically.

The present invention contemplates the provision of a shutter mechanism including means for automatically effecting a color balanced exposure of photosensitive material. A balance in the spectral distribution of the scene light to which the photosensitive material 12 is exposed is achieved in accordance with the present invention by successively filtering the exposure light during the exposure interval through a plurality of carefully selected color compensating filters. The filters are automatically moved into position successively over the exposure aperture 16 on the optical axis A—A each for an interval which is inversely related to the intensity of the light transmitted by that filter. Thus, the photosensitive material will be exposed to light in the predominant wavelengths for the shortest period of time.

Various combinations of filters may be employed. For example, an effective combination may include a yellowish filter and a bluish filter. As illustrated by the spectral transmission curves of FIG. 2, the bluish filter may be selected to transmit light in a broad band of frequencies extending through the higher energy (tonally "cooler") portion of the visible spectrum and into the central or green portion of the spectrum. For use with photosensitive material color balanced for a color temperature of 3200° K., for example, a bluish filter with a Wratten No. 80A may be utilized. The yellowish filter may be selected to transmit light in a broad band of frequencies extending through the lower energy (tonally "warmer") portion of the visible spectrum and into the central or green region. By way of example, with photosensitive material color balanced for a color temperature of 3200° K., a yellowish filter with a Wratten No. 85B may be employed. As indicated in FIG. 2, such filters would have their spectral transmission curves overlapping in the green region of the spectrum in order that light of frequencies in this region will not be excessively attenuated. Thus, for example, if the scene light is composed predominantly of blue light, as from a scene including a large area of blue sky, the shutter mechanism effects, successively, exposure for a short interval through the bluish filter (transmitting a high percentage of light at the blue end of the spectrum), and exposure for a longer interval through the yellowish filter (transmitting a high percentage of light at the blue end of the spectrum). The middle wavelength light in the green region of the spectrum would be transmitted by the respective filter during each exposure interval to effect a balance of the middle wavelength light with the short and long wavelength light admitted to the photosensitive material.

Conversely, in photographing scenes or subjects in which the world light is composed predominantly of the tonally "warmer" frequencies at the lower energy end of the visible spectrum, the photosensitive material will be subjected to a longer exposure through the bluish filter than through the yellowish filter.

The shutter mechanism 10 is designed to accommodate a first filter 71 in orifice 20 of the opening blade 18 and a second filter 72 in orifice 22 of the opening blade 18. In order to effect successive time-controlled exposures of the photosensitive material 12 through filters 71 and 72, control means are provided. The control means include the electromagnetically actuated latch means 40 and the electromagnet 64 and a control circuit for controlling the operation of the latch means 40 and the electromagnet 64. The control circuit is shown in FIG. 3.

In order to provide rapid energization and de-energization of coils 58, 66, comprising elements of electromagnets 57, 64, respectively, and to promote low power consumption, the control circuit may take the form of a transistorized, two-stage, modified Schmitt-type trigger circuit 74. The trigger circuit 74 may include coil 66 in series with an NPN transistor $Q_1$ serving as a switch to control the energization of the coil 66. In a parallel circuit, coil 58 is connected in series with a second NPN transistor $Q_2$ which similarly serves as a switch for controlling the energization of coil 58. Capacitors 76, 78, shunt coils 66, 58 respectively, to prevent any damage to transistors $Q_1$ and $Q_2$ which might otherwise be caused by high voltages induced in coils 66, 58 when switching occurs. Variable bias resistors 80, 82 control the base bias currents for transistors $Q_1$ and $Q_2$, respectively. A source of electrical power $E_o$ is connected across transistors $Q_1$ and $Q_2$.

It is evident from the construction of the portion of the trigger circuit 74 just described, that closing of a switch $S_1$ by the manual depression of actuator 38, assuming proper resistance values of variable resistors 80, 82, causes both of transistors $Q_1$ and $Q_2$ to be turned on and coils 66 and 58 to be energized.

To initiate exposure, actuator 38 is depressed, freeing the opening blade 18 for movement to its first light unblocking position, hereinafter termed a first light filtering position, wherein the end portion 52 of latch member 50 engages pin 54. In this position the first filter 71 is disposed upon the optical axis A—A.

In order to time the interval during which the photosensitive material 12 is exposed to scene light through the filters 71, 72, photoresponsive means such as a photoconductor 86 is provided. The photoconductor 86 is oriented and located so as to be exposed to light from the scene through an opening 87 in a wall of the camera in which the shutter mechanism is incorporated.

So that the photoconductor 86 and the photosensitive material 12 may be subjected simultaneously to light of the same spectral distribution, the opening blade 18 may include a further pair of orifices 88, 89 containing third and fourth color compensating filters 90, 91 having identical spectral transmission characteristics to that of the first and second filters 71, 72, respectively. The photoconductor 86 is disposed in relationship to the opening blade 18 and the scene such that the photoconductor 86 and the photosensitive material 12 are simultaneously exposed to scene light through filters having the same spectral transmission characteristics.

The photoconductor 86 is connected in the trigger circuit of FIG. 3 in a timing network including capacitors 92, 94 alternately connectable in series with the photoconductor 86 through a single pole-double throw switch $S_2$. Capacitors 92, 94 are shunted by high resistance resistors 95, 96, respectively, which serve to discharge the connected capacitor when the capacitor is disconnected in a charged state by the operation of switch $S_2$.

An NPN transistor $Q_3$ is provided to sense the voltage developed across capacitor 92 or 94. The transistor $Q_3$ has its collector electrode 97 coupled through a single pole-double throw switch $S_4$ to either of the base electrodes 98, 100, of transistors $Q_1$, $Q_2$, respectively, and has its base electrode 102 connected at a terminal 104 between the photoconductor 86 and the switch $S_2$. The emitter electrode 106 of transistor $Q_3$ is connected through a single pole-double throw switch $S_5$ to either of wiper arms 108 or 110, comprising part of variable resistors 112, 114 connected in series with emitter electrodes 116, 118 of transistors $Q_1$, $Q_2$, respectively. The connection of the emitter electrode 106 of transistor $Q_3$ to either of variable resistors 112 or 114 renders the bias across the base and emitter electrodes 102, 106 of transistor $Q_3$ to be responsive to changes in the collector current through transistors $Q_1$ or $Q_2$. This arrangement establishes regenerative feedback from transistors $Q_1$ or $Q_2$ to transistor $Q_3$ which has the effect of accelerating the switching action accomplished by transistors $Q_1$ and $Q_2$.

The base electrode 102 of transistor $Q_3$ is connected to ground through a switch $S_6$. Referring to FIGURE 1, it will be seen that switch $S_6$ comprises a pair of resilient contacts 120, 122 electrically connected through a contact block 124 on the opening blade 18 when the blade 18 is in its light blocking position. The switch $S_2$ acts to ground the base electrode of transistor $Q_3$ before initiation of exposure; thus, the initial charge on the timing capacitors 92 or 94 will always be zero at the initiation of exposure.

Referring to FIGURE 1, switches $S_2$, $S_4$, and $S_5$ in a switch stack 125 are actuated simultaneously by a cam 126 on the opening blade 18 which deflects a non-conductive switch operator member 128 interconnecting the poles of switches $S_2$, $S_4$, and $S_5$ when the opening blade 18 moves from its first light filtering position to its second light filtering position.

Assuming filters 71 and 90 to be bluish and filters 72 and 91 to be yellowish, the operation of the shutter mechanism illustrated in FIGURE 1, as controlled by the FIG. 2 trigger circuit 74, is as follows. The operator initiates exposure by manually depressing the end 44 of actuator 38 which closes $S_1$ and effects a release of the opening blade 18. The opening blade 18 moves under the influence of spring 24 until pin 54 is engaged by the end portion 52 of latch member 50. The closing of switch $S_1$ by the depression of the actuator 38 causes, as explained above, transistors $Q_1$ and $Q_2$ to conduct and coils 58, 60 to be energized. The energized electromagnet 57 retains the latch member 50 in its operative position and the energized electromagnet 64 retains the closing shutter blade 30 in its light unblocking position.

Switch $S_6$ is opened as the opening blade 18 departs from switch contacts 120, 122. At the instant switch $S_6$ opens, the capacitor 92 begins to charge and a voltage increasing exponentially with time is developed across the capacitor 92. With the opening blade 18 in its first light filtering position with bluish filters 71, 90 simultaneously intercepting scene light transmitted to the photosensitive material 12 and to the photoconductor 86, voltage is developed across the capacitor 92 at a rate which is determined by the intensity of the filtered light reaching the photoconductor 86. If, for example, the scene light has a predominantly blue content, the intensity of the light transmitted by the filter 90 to the photoconductor 86 will be relatively high and a voltage increasing rapidly with time will be developed across the capacitor 92. At a predetermined trigger voltage determined by the voltage on the emitter electrode 106 of transistor $Q_3$ and the base to emitter bias voltage needed to turn transistor $Q_3$ on, transistor $Q_3$ will start to conduct. As the conduction of transistor $Q_3$ increases, its collector to emitter resistance drops, decreasing the base to emitter voltage bias of transistor $Q_1$. With less base to emitter voltage bias, the conduction of $Q_1$ decreases. The potential of the emitter electrode 106 of transistor $Q_3$ decreases correspondingly, increasing the bias on transistor $Q_3$. This regenerative feedback from transistor $Q_1$ to transistor $Q_3$ causes a very rapid switching of transistor $Q_1$ from a conducting state to a non-conducting state and transistor $Q_3$ from a non-conducting state to a state wherein it is fully conducting.

As transistor $Q_1$ is turned off, coil 66 comprising part of electromagnet 57 is de-energized. The spring 56 thus is able to draw the latch member 50 free of pin 54, releasing the opening blade 18 for movement to its second light filtering position wherein the yellowish filters 72, 91 simultaneously intercept scene light transmitted to the photosensitive material 12 and to the photoconductor 86.

As the opening blade 18 moves to its second light filtering position, cam 126 on the opening blade 18 acts upon the switch operator 128, causing switches $S_2$, $S_4$ and $S_5$ to be switched to the opposing pole. Thus a second timed exposure interval is initiated. After an interval dependent upon the intensity of the light transmitted by the yellowish filter 91 to the photoconductor 86, a trigger voltage is developed across capacitor 94 which is effective to again turn on transistor $Q_3$ which has been turned off by the action of switch $S_2$. With transistor $Q_3$ again conducting transistor $Q_2$ is switched off and coil 58 is de-energized, effecting a release of the closing shutter blade 30 for movement to its light blocking position.

In order that the opening and closing shutter blades 18, 30 may be restored to their pre-exposure positions, reset means may be provided. The reset means may include a cocking arm 130 rigidly connected through a shaft 132 to a reset lever 134. A reset bar 136 affixed to the opening blade 18 is engaged by the reset lever 134 when the cocking arm 130 is rotated counterclockwise, moving both the opening and the closing blades 18, 30 to their pre-exposure positions.

Other structures may be devised with which to practice the invention. An alternate shutter mechanism 10' which may be constructed in accordance with the invention is illustrated in FIG. 4. The shutter mechanism 10' may have many elements of the shutter mechanism 10 illustrated in FIGURE 1. For example, closing blade 30, electromagnet 64 for magnetically retaining the closing blade 30, actuator 38, and trigger circuit 74 may be the same. Other elements which may be common to both embodiments are designated with like reference numerals. The shutter mechanism 10', rather than having an opening blade 18 which carries the filter means and which moves from a light blocking position to first and second light filtering positions, a simple opening blade 138 may be employed. Separate filter apparatus 140 may be used to carry first filter means (yellow, for example) and second filter means (yellowish, for example).

The opening blade 138 would have two, rather than three positions, a light blocking position wherein a pin 48 is retentively engaged by the actuator 38, and a light unblocking position wherein an orifice 150 is disposed on the optical axis A—A over the exposure aperture 16.

The filter apparatus 140 may take the form of a centrally pivoted, spring-biased member 152 mounting the first and second filter means. The first filter means may, for example, be bluish, transmitting light in a broad band of frequencies in the higher energy portion of the visible spectrum, and may comprise a first pair of filters 154, 156, having the same spectral transmission characteristics for simultaneously intercepting scene light transmitted to the photosensitive material 12 and to the photoconductor 186, respectively. Similarly, the second filter means for transmitting light in a broad band of frequencies in the lower energy portion of the visible spectrum may comprise first and second cyan filters 158, 160 for simultaneously intercepting scene light transmitted to the photosensitive material 12 and the photoconductor 186, respectively.

In order to electrically control movement of the member 152 from a first position (shown in solid lines in FIG. 4) wherein the filters 154, 156 are in operative positions to a second position displaced clockwise from the first position (shown in broken lines in FIG. 4) wherein the yellowish filters are in operative positions, an electromagnet 164 is provided. The electromagnet 164 may be constructed to operate similarly to the electromagnet 64 which functions to magnetically retain the closing blade 30 in its light blocking position. The electromagnet 164 comprises a coil 166 and a pole piece 168 engageable with a ferromagnetic keeper 170 mounted on the member 152.

A switch stack 125 including switches $S_2$, $S_4$, and $S_5$ has a non-conductive switch operator member 128 which is engaged by a radial projection 174 on the member 152 as the member 152 moves from its first light filtering position to its second light filtering position.

Briefly, the operation of the shutter mechanism 10' is as follows. The trigger circuit 74 illustrated in FIG. 2 may be used to control the energization of the electromagnets 64, 164. Exposure of the photosensitive material 12 is initiated by the manual depression of actuator 38 which frees the opening blade 138 for movement from its light unblocking position (shown in broken lines in FIG. 4) wherein the orifice 150 is disposed on the optical axis A—A. Depression of the actuator 38 also closes switch $S_1$, causing electromagnets 64, 164 to be energized. Thus when reset bar 136' moves out of retentive engagement with the member 152, as the opening blade 138 moves to its light unblocking position as exposure is initiated, the member 152 is retained by the electromagnet 164 with the bluish filters 154, 156, simultaneously intercepting light transmitted to the photosensitive material 12 and to the photoconductor 186, respectively.

After exposure of the photosensitive material 12 for an interval through the bluish filter 154 inversely related to the intensity of light transmitted by the bluish filters 154, 156, the trigger circuit 74, for the reasons set forth above with respect to the FIGURE 1 shutter mechanism 10, effects a de-energization of the electromagnet 164. The member 152 moves rapidly under the influence of a spring 175 to its second light filtering position wherein the yellowish filters 158, 160 intercept scene light transmitted to the photosensitive material 12 and to the photoconductor 186, respectively. After exposure of the photosensitive material 12 through the yellowish filter 158 for an interval inversely related to the intensity of light transmitted by the yellowish filters 158, 160, the trigger circuit 74 effects a de-energization of the electromagnet 64. The closing blade 30 is thus freed for movement by the spring 34 to its light blocking position to terminate exposure.

Another shutter mechanism 10" which may be constructed in accordance with the teachings of the invention is shown in FIG. 5. The shutter mechanism 10" may have many elements common to the shutter mechanisms 10 and 10', illustrated in FIGS. 1 and 4, respectively. The exemplary mechanism 10", rather than utilizing a single opening blade carrying the filter means, as shown in FIGURE 1, or separate filter apparatus, as shown in FIG. 4 the filter means may be carried by first and second shutter blades 176, 178, respectively.

The first shutter blade 176 may have a light blocking position, a light filtering position wherein a first filter, which may be bluish, is disposed on the optical axis A—A, and a light unblocking position wherein an open orifice 182 is disposed on the optical axis A—A. The second shutter blade 178 may have a light unblocking position wherein an orifice 184 is disposed on the optical axis A—A and a light filtering position wherein a second filter 186, which may be yellowish, is disposed on the optical axis A—A.

An electromagnet 188 having a coil 58 and operating on a ferromagnetic keeper 190 on the second shutter blade 178 serves to retain the second shutter blade 178 in its light unblocking position prior to initiation of exposure.

In order that the first filter 180 may be moved off the optical axis A—A and the orifice 182 brought on the optical axis A—A when the second filter 186 is moved onto the optical axis A—A, interlock means 192 are pivoted. The interlock means 192 may comprise a rotatably mounted crank lever 194 having an end portion 196 engageable by a cam 198 on the second shutter blade 178. The crank lever 194 has an L-shaped transverse extension 200 having a leg 202 bent from the axis of the extension 200 for retentively engaging a pin 204 on the first shutter blade 176.

The electromagnet 64 controlling movement of the closing shutter blade 30 and the electromagnet 188 controlling movement of the second shutter blade 178 are controlled by a trigger circuit very similar to the trigger circuit illustrated in FIG. 2 and described above.

In order that the trigger circuit may be responsive to scene light having the same spectral distribution as the scene light reaching the photosensitive material 12 at all times during exposure, photoconductors 206, 208 are provided, being exposed to scene light through third and fourth filters 210, 212, respectively. Third filter 210 has a spectral transmission characteristic identical with that of the first filter 180 carried on the first shutter blade 176. Fourth filter 212 has the same spectral transmission characteristic as the second filter 186 carried on the second shutter blade 178.

A trigger circuit similar to the trigger circuit 74 of FIG. 2 may be used to control the electromagnets 64, 188; the trigger circuit may have a timing circuit modified as shown in FIG. 6 to accommodate photoconductors 206, 208. A switch S₇ may be included for the purpose of switching between the parallel R-C timing networks during the exposure interval as the first and second filters 180, 196 are caused to be shifted during the exposure interval in accordance with the invention.

Briefly, the operation of the FIG. 5 shutter mechanism 10'', as controlled by the FIG. 2 trigger circuit modified as shown in FIG. 6, is as follows. Depression of the actuator 38 to initiate exposure releases the first shutter blade 176 for movement to its light filtering position. Switch S₁ is closed by the depression of actuator 38, causing electromagnets 64, 188 to be energized. After the photosensitive material 12 has been exposed through the first filter, which for example, may be bluish, for an interval inversely related to the intensity of the light transmitted through the third filter 210 to the photoconductor 206, the electromagnet 188 will be de-energized. Under the influence of a spring 214 operating on the second shutter blade 178, the second shutter blade 178 moves to its light filtering position wherein the second filter 186 (which may, for example, be yellowish) is disposed on the optical axis A—A. As the second shutter blade 178 moves to its light filtering position, a cam 216 thereon actuates switches S₂, S₄, S₅ and S₇. Also, as the second shutter blade 178 moves to its light filtering position, cam 198 operates on crank lever 194, effecting a disengagement of the extension 200 from pin 204, allowing the first shutter blade 176 to move from its light filtering position to its light unblocking position.

After the photosensitive material 12 has been exposed to scene light through the second filter 186 for a time inversely related to the intensity of the scene light transmitted through the fourth filter 212 to the photoconductor 208, the trigger circuit effects a de-energization of the electromagnet 64, terminating exposure.

Certain changes may be made in the above apparatus without departing from the scope of the invention herein involved. For example, a four-bladed shutter might be constructed using the principles of the invention, comprising an opening blade, a closing blade, and a plurality of electrically controllable, two station blades carrying color compensating filters. It is also contemplated, for example, that apparatus could be constructed using filters varying in number and/or spectral transmission characteristics from those described above. It is intended therefore that all matter contained in the above description or shown in the accompanying drawings shall be interpreted as illustrative and not in a limiting sense.

What is claimed is:

1. A shutter mechanism for photographic apparatus for automatically effecting a color balanced exposure of a photosensitive material within the apparatus, comprising:
    means defining an exposure aperture;
    first shutter means for initiating exposure movable from a length blocking position to a predetermined number of light filtering positions;
    second shutter means movable from a light unblocking position to a light blocking position to terminate exposure;
    means for urging said first shutter means toward said light filtering positions and said second shutter means toward said light blocking position;
    photoresponsive means exposed to light from the scene to be photographed, said photoresponsive means having an electrical parameter which varies in dependence on the intensity of light incident thereon;
    a plurality of filter means carried on said first shutter means, each filter means transmitting light in a broad band of frequencies, the bands being uniformly distributed across the visible spectrum, each filter means having filter areas arranged on said first shutter means such that in each of said light filtering positions of said first sutter means a different one of said filter means simultaneously intercepts scene light entering the exposure aperture and scene light impinging upon said photoresponsive means; and
    control means responsive to said electrical parameter of said photoresponsive means and controlling the movement of said first shutter means through said light filtering positions for effecting a sequential positioning of each of said filter means individually over said exposure aperture and over said photoresponsive means for an interval inversely related to the intensity of light transmitted by that filter means, whereby a balanced spectral distribution of the light admitted through said plurality of filter means to the photosensitive material is produced, said control means actuating said second shutter means to terminate exposure after a total exposure interval representing the sum of said intervals.

2. The apparatus defined by claim 1 wherein said control means includes a voltage sensitive trigger circuit having an R-C timing network including said photoresponsive means and capacitance means for developinging a voltage varying with time in accordance with the intensity of scene light transmitted to said photoresponsive means, and wherein said control means includes electrically actuated latch means for retentively engaging said first means in a first one of said light filtering positions upon initiation of exposure, said trigger circuit tripping said latch means to release said first shutter means for movement to a second light filtering position in response to the development of a trigger voltage across said capacitance means.

3. The apparatus defined by claim 2, wherein said plurality of filter means comprises a first filter means transmitting light in a broad band of frequencies in a higher energy portion of the visible spectrum and a second filter means transmitting light in a broad band of frequencies in a lower energy portion of the visible spectrum, said bands being partially co-extensive in a medial portion of the spectrum.

4. A shutter mechanism for photographic apparatus for automatically effecting a color balanced exposure of a photosensitive material within the apparatus, comprising:
    means defining an exposure aperture;
    first means movable successively from a light blocking position to a light filtering position and then to a light unblocking position;
    a first filter carried with said first means onto the optical axis when said first means is in its light filtering position, said first filter transmitting light in a first broad band of frequencies in a higher energy portion of the visible spectrum;
    second means movable from a light unblocking position to a light filtering position;
    a second filter carried with said second means onto the optical axis when said second means moves to its light filtering position, said second filter transmitting light in a second broad band of frequencies in a lower energy portion of the visible spectrum, said first and second frequency bands being partially co-extensive in a medial portion of the spectrum;
    third means movable from a light unblocking position to a light blocking position to terminate exposure;
    means for urging said first means toward said light unblocking position, and said second means toward said light filtering position and said third means toward said light blocking position;
    photoresponsive means exposed to light from the scene to be photographed, said photoresponsive means having an electrical parameter which varies in dependence on the intensity of light incident thereon;
    third and fourth filters having the same spectral transmission characteristics as said first and second filters, respectively, said third and fourth filters being positioned so as to intercept scene light impinging upon said photoresponsive means; and control means responsive to said electrical parameter of said photoresponsive means and controlling the movement of said first and second means for effecting a sequential positioning of each of said first and second filters individually over said exposure aperture, said control means including means for effecting exposure to scene light of said photosensitive means through said third filter when said first filter is positioned over said exposure aperture and for effecting exposure to scene light of said photoresponsive means through said fourth filter when said second filter is positioned over said exposure aperture, said control means positioning each of said first and second filter means over said exposure aperture for an interval inversely related to the intensity of light transmitted by that filter, whereby a balanced spectral distribution of the light admitted through said first and second filters to the photoresponsive material is produced, said control means actuating said third means to terminate exposure after a total exposure interval representing the sum of said intervals.

5. The apparatus defined by claim 4 wherein said control means includes a voltage-sensitive trigger circuit having an R-C timing network including said photoresponsive means and capacitance means for developing a voltage varying with time in accordance with the intensity of scene light transmitted to said photoresponsive means, and wherein said control means includes first electrically actuated means for retentively engaging said second means in its light unblocking position and second electrically actuated means for retentively engaging said third means in its light unblocking position, said control means including interlock means coupled between said first and second means for freeing said first means for movement from said light filtering position to said light unblocking position in response to movement of said second means to its light filtering position, said trigger circuit successively tripping said first and second electrically actuated means to effect a sequential positioning of each of said first and second filters individually over said exposure aperture.

6. A shutter mechanism for photographic apparatus for automatically effecting a color balanced exposure of a photosensitive material within the apparatus, comprising:
means defining an exposure aperture;
first shutter means movable from a light blocking position to a light unblocking position to initiate exposure;
second shutter means movable from a light unblocking position to a light blocking position to terminate exposure;
means for urging said first shutter means toward said light unblocking position and said second shutter means toward said light blocking position;
photoresponsive means exposed to light from the scene to be photographed, said photoresponesive means having an electrical parameter which varies in dependence on the intensity of light incident thereon;
filter means comprising:
a mounting member movable between first and second positions,
means for urging said member toward said second position,
first filter means carried on said member, said first filter means transmitting light in a first broad band of frequencies in a higher energy portion of the visible spectrum, and
second filter means carried on said member, said second filter means transmitting light in a second broad band of frequencies, in a lower energy portion of the visible spectrum, said bands being partially co-extensive in a medial portion of the spectrum, each of said filer means having filter areas on said member arranged so as to simultaneously intercept scene light entering said exposure aperture and scene light impinging on said photoresponsive means said first and second filter means being arranged on said member such that said first filter means is disposed over said exposure aperture and over said photoresponsive means when said member is in said first position, and such that said second filter means is disposed over said exposure aperture and said photoresponsive means when said member is disposed in said second position; and
control means responsive to said electrical parameter of said photoresponsive means and controlling the movement of said filter member after exposure has been initiated for effecting a sequential positioning of each of said filter means simultaneously over said exposure aperture and said photoresponsive means for an interval inversely related to the intensity of light transmitted by that filter means, whereby a balanced spectral distribution of the light admitted through said first and second filter means to the photosensitive material is produced, said control means actuating said second shutter means to terminate exposure after a total exposure interval representing the sum of said intervals.

7. The apparatus defined by claim 6 wherein said control means includes a voltage-sensitive trigger circuit having an R-C timing network including said photoresponsive means and capacitance means for developing a voltage varying with time in accordance with the intensity of scene light transmitted to said photoresponsive means, and wherein said control means includes electrically actuated latch means for retentively engaging said mounting member in said first position upon initiation of exposure, said trigger circuit tripping said latch means to release said member for movement to said second position in response to the development of a trigger voltage across said capacitance means, whereby said control means effects a timed sequential exposure of the photosensitive material through said first and scond filter means.

References Cited
UNITED STATES PATENTS

| | | |
|---|---|---|
| 3,229,569 | 1/1966 | Frost. |
| 3,241,441 | 3/1966 | Barbour. |
| 3,245,309 | 4/1966 | Wicki. |

JOHN M. HORAN, Primary Examiner

U.S. Cl. X.R.
355—38, 88